O. LEONARD.
Milk-Cooler.

No. 215,376. Patented May 13, 1879.

UNITED STATES PATENT OFFICE.

ORIN LEONARD, OF BELVIDERE, ILLINOIS.

IMPROVEMENT IN MILK-COOLERS.

Specification forming part of Letters Patent No. 215,376, dated May 13, 1879; application filed February 15, 1879.

*To all whom it may concern:*

Be it known that I, ORIN LEONARD, of Belvidere, in the county of Boone and State of Illinois, have invented a new and valuable Improvement in Milk-Coolers; and I do hereby declare that the following is a full, clear, and exact description of the construction and operation of the same, reference being had to the annexed drawings, making a part of this specification, and to the letters and figures of reference marked thereon.

Figure 1:
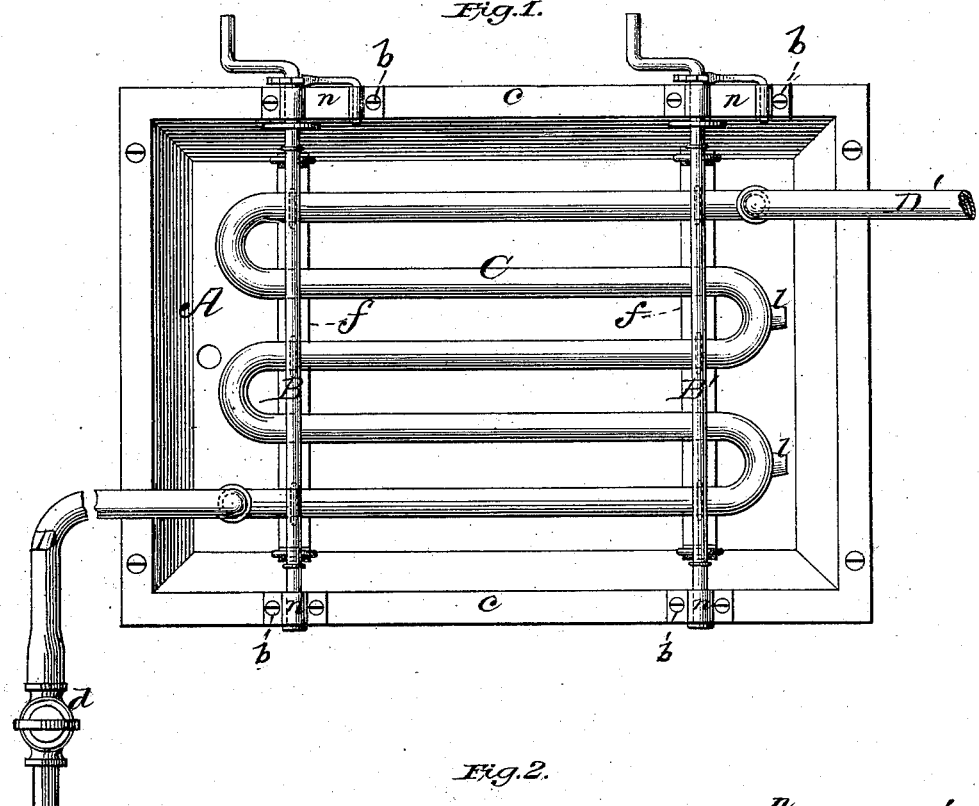
Figure 2:
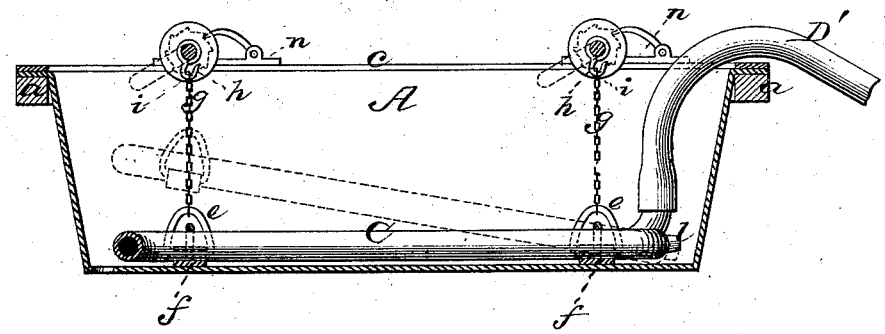

Figure 1 of the drawings is a representation of a top view of my improved milk-cooler. Fig. 2 is a longitudinal section of the same.

This invention has relation to improvements in means for cooling milk, sirups, and other liquids.

The nature of the invention consists in the combination, with a milk-pan having removable bearing-plates, of the transverse winding-shafts extending across said pan and engaging said plates, the transverse carrier-braces having end rings, the serpentine cooling-tube secured to and carried by said braces, its flexible induct and educt, the detachable raising-chains, and shaft-hooks, whereby the cooling-tube is raised or lowered in the pan, as hereinafter shown and described.

In the annexed drawings, the letter A designates a milk-reservoir of any desired size, and usually made of tin or other metal. This pan is preferably of rectangular form, but may be made with rounding corners, if I so elect.

The overhanging upper edge of the pan is re-enforced and stiffened by a strong wooden rib, $a$, secured to its under side.

Near each end of the pan, directly opposite each other, are secured the bearing-plates $n$, in which the transverse winding-shafts B B' are journaled. These plates are provided on their under sides with projecting pins $b$, that enter corresponding perforations in the edge flange $c$ of the pan, and are thereby detachably secured thereto.

C indicates a cooling-tube, the same being of serpentine form, and provided at one end with a flexible induct, D, and at the other with a similar educt, D', the former having a stop-cock, D.

The branches of the cooling-tube are connected together by the transverse carrier-braces $f$, having at each end a ring, $e$, one of the said braces being near each end of the coil.

To each of these rings is secured permanently a chain, $g$, that extends upward and engages a hook, $h$, on the winding-shafts or winches. These hooks are open, and are engaged by rings $i$ upon the free ends of these chains, the object being to cause the latter to hold to the hooks when the shafts are turned in one direction, and drop off therefrom when turned oppositely.

By winding up the chains upon the drums or winches the cooling-tube may be raised in the pan, according to the quantity of milk therein.

It is well known that the colder strata of milk are at the bottom of the pan, and that as the milk is cooled it sinks thereto; consequently the cooling-tube should be located just under the surface of the fluid, and be adjustable higher or lower. This is accomplished by means of the winches and chains aforesaid, the adjustment of the said tube being regulated and secured by a ratchet-and-pawl mechanism.

Cream having formed, the cooling-tube is lowered to the bottom of the pan, and the chains drop off the hooks, thus leaving the whole surface of the milk clear for skimming off the cream.

Should the winches prove an obstruction, they may also be lifted off of the pan, their bearing-plates being, as above described, removably secured thereto for the purpose.

When the skimmed milk has been drawn out of the pan water may be drained out of the cooler-tube by opening the necks $l$ in one end thereof and then allowing this end to drop into the pan.

What I claim as new, and desire to secure by Letters Patent, is—

The combination, with the milk-pan A, having removable bearing-plates $n$, of the winding-shafts B B', extending across said pan and engaging said plates, the transverse carrier-braces $f$, having end rings $e$, the serpentine cooling-tube C, secured to and carried by the braces $f$, its flexible induct and educt ends D D', the detachable raising-chains $g$, and shaft-hooks $i$, whereby the cooling-tube is raised or lowered in the pan, substantially as specified.

In testimony that I claim the above I have hereunto subscribed my name in the presence of two witnesses.

ORIN LEONARD.

Witnesses:
 J. C. LONGCOR,
 A. O. WILLIAMS.